United States Patent [15] 3,646,444
Bitzer [45] Feb. 29, 1972

[54] METHOD AND APPARATUS FOR SYNCHRONIZING THE TRANSMISSION OF DIGITAL SIGNALS BETWEEN GROUND STATIONS VIA A COMMUNICATIONS SATELLITE

[72] Inventor: Wolfgang Bitzer, Unterweissach, Germany

[73] Assignee: Telefunken Patentverwertungsgesellschaft m.B.H., Ulm(Danube), Germany

[22] Filed: Oct. 8, 1969

[21] Appl. No.: 864,818

[30] Foreign Application Priority Data

Oct. 16, 1968 Germany ........................P 18 03 263.8
Feb. 5, 1969 Germany ........................P 19 05 532.4

[52] U.S. Cl. ........................325/58, 325/421, 343/225
[51] Int. Cl. ........................H04b 1/40
[58] Field of Search ........................325/58, 419, 421, 4, 5; 179/15 BS; 343/225, 7.5

[56] References Cited

UNITED STATES PATENTS

| | | | |
|---|---|---|---|
| 3,424,864 | 1/1969 | Williams | 325/58 X |
| 3,430,237 | 2/1969 | Allen | 325/4 X |
| 3,530,252 | 9/1970 | Puente | 179/15 |

*Primary Examiner*—Robert L. Griffin
*Assistant Examiner*—Kenneth W. Weinstein
*Attorney*—Spencer & Kaye

[57] ABSTRACT

A method and apparatus for synchronizing the transmission of data between a plurality of ground stations via a satellite by transmitting a fixed frequency reference signal from a reference ground station, receiving this signal at every other ground station, producing at each other ground station a first local signal identical in frequency and phase with the received reference signal, producing at each other ground station a second local signal, transmitting this signal to the satellite and receiving this signal back at the ground station from which it originated, and varying the second local signal until it has a value such that upon its reception back at the originating station it is identical in frequency and phase with the first local signal produced at that station.

15 Claims, 2 Drawing Figures

*Inventor:*
Wolfgang Bitzer

BY Spencer & Kaye
ATTORNEYS.

Inventor:
Wolfgang Bitzer
BY Spencer & Kaye
ATTORNEYS.

METHOD AND APPARATUS FOR SYNCHRONIZING THE TRANSMISSION OF DIGITAL SIGNALS BETWEEN GROUND STATIONS VIA A COMMUNICATIONS SATELLITE

BACKGROUND OF THE INVENTION

The present invention relates to a method and circuit arrangement for synchronizing the clock and/or carrier frequency between a plurality of ground stations during the transmission of digital signals via communications satellites by multiple access time multiplexing.

A method has become known for transmitting binary signals, e.g., Pulse Code Modulated signals, via communications satellites between a plurality of ground stations by means of a multiple access time multiplex technique. This is described in the ICSC (International Communication Satellite Consortium) Report ICSC/T-17-6E W/1/67 of Dec. 6th, 1966, entitled "A Time Division Multiple Access Experiment." According to this method, the participating ground stations transmit a cyclic sequence of so-called bursts consisting of a succession of bits according to a fixed timing pattern. The instants of transmission of these bursts are so controlled that they arrive at the satellite with a timed spacing which allows for the quite long signal delays on the way to the satellite, and overlappings are definitely eliminated.

The binary signals are here preferably modulated onto an HF carrier according to the phase modulation method.

To demodulate and detect the binary signals at the receiving ground station it is necessary to regenerate the carrier signal as well as the bit timing signal with proper frequency and phase position. In the known process, due to the delay time being different for each burst or due to Doppler effects, each burst arrives at all receiving ground stations with a different phase position or frequency. This is true for the clock frequency as well as for the HF carrier, which can also be additionally influenced by different single sideband frequency conversions occurring in the transmission path. As a result, the demodulator in the receiver must be synchronized anew with the bit timing as well as with the carrier for each burst, which can be realized in practice only with difficulty aside from the fact that a considerable amount of the time available for the transmission of the data is lost. Moreover, complicated equipment is required at the receiving end to recognize the beginning of the burst and at the transmitting end to control the burst transmitting phase, i.e., the instant at which the burst is transmitted.

SUMMARY OF THE INVENTION

It is a primary object of the present invention to eliminate, or at least substantially reduce, these above-described difficulties and drawbacks of the known method without any increase in circuitry.

As already mentioned above, the described difficulties are caused by the fact that the carrier as well as the clock oscillations of each of the received bursts are not coherent, i.e., synchronized, with those of the other bursts from other ground stations. The basic concept of the present invention is to control the clock and/or carrier frequency at the transmitting end so that the transmitted bursts arrive at the satellite coherently with all other bursts, i.e., with the same frequency and phase position. Thus, they are inevitably also emitted coherently from the satellite and received coherently by all ground stations.

This is achieved by causing one of the ground stations (called "reference station" hereafter) to transmit its burst (called "reference burst" hereafter) at a carrier and a clock frequency which is furnished by a local fixed-frequency oscillator, e.g., a quartz-controlled oscillator.

All other ground stations receive this reference burst and from it they derive its carrier and clock frequency as well as its phase position. With the carrier and/or clock voltage thus derived, the phase position of an oscillator oscillating at the respective frequency of the ground station is compared in a first control circuit and is regulated until the difference between the two phase positions disappears. This oscillator furnishes the carrier and/or clock voltage for processing the received signals.

However, each ground station receives, in addition to the reference burst, also the burst which it transmitted itself after this burst has transversed the path to the satellite and back. From this received "own burst" the carrier and/or clock phase is also derived and compared with that of the described oscillator for the carrier or clock voltage at the receiving end.

The thus derived control criteria are used to regulate an oscillator which furnishes the carrier voltage at the transmitting end and/or an oscillator for the bit timing in a second control loop until coherence exists between the reference and the station's own burst.

Generally, the subsequent regulation of the carrier frequency will not be accomplished directly but at the intermediate frequency level. In this case, the term "carrier" should be interpreted as "intermediate frequency."

Stated more specifically, the above and other objects according to the invention are achieved by the provision of a novel method and apparatus for synchronizing the time-division multiplex transmission of digital data signals via a satellite between a plurality of ground stations, one of which is a reference station, by: generating at the reference station a signal having a fixed frequency constituting a basic reference frequency for such transmission and transmitting reference bursts of this fixed frequency from the reference station to the satellite; receiving these reference bursts from the satellite at a second ground station; generating at such second ground station a local reception control signal whose frequency is substantially equal to such fixed frequency; electronically comparing, at such second station, the phase of the received reference bursts with the phase of the local reception control signal; and varying, on the basis of such comparison, the local reception control signal in a direction to eliminate the phase difference between the received reference bursts and the local reception control signal, whereby the local reception control signal provides a reference for processing the data signals received by the second station.

The objects according to the invention are further achieved by additionally providing a method and apparatus for generating at the second station a local transmission control signal and transmitting local reference bursts of this signal to the satellite, receiving these local reference bursts back from the satellite at the second station, electronically comparing, at the second station, the phase of the local reference bursts received back from the satellite with the phase of the local reception control signal, and varying the local transmission control signal in a direction to eliminate the phase difference, at the second station, between the received local reference bursts and the local reception control signal, whereby the local transmission control signal provides a reference for transmitting, from the second station, data which will arrive at the satellite coherently with data transmitted from the reference station.

DESCRIPTION OF THE PREFERRED EMBODIMENTS

Figure 1:
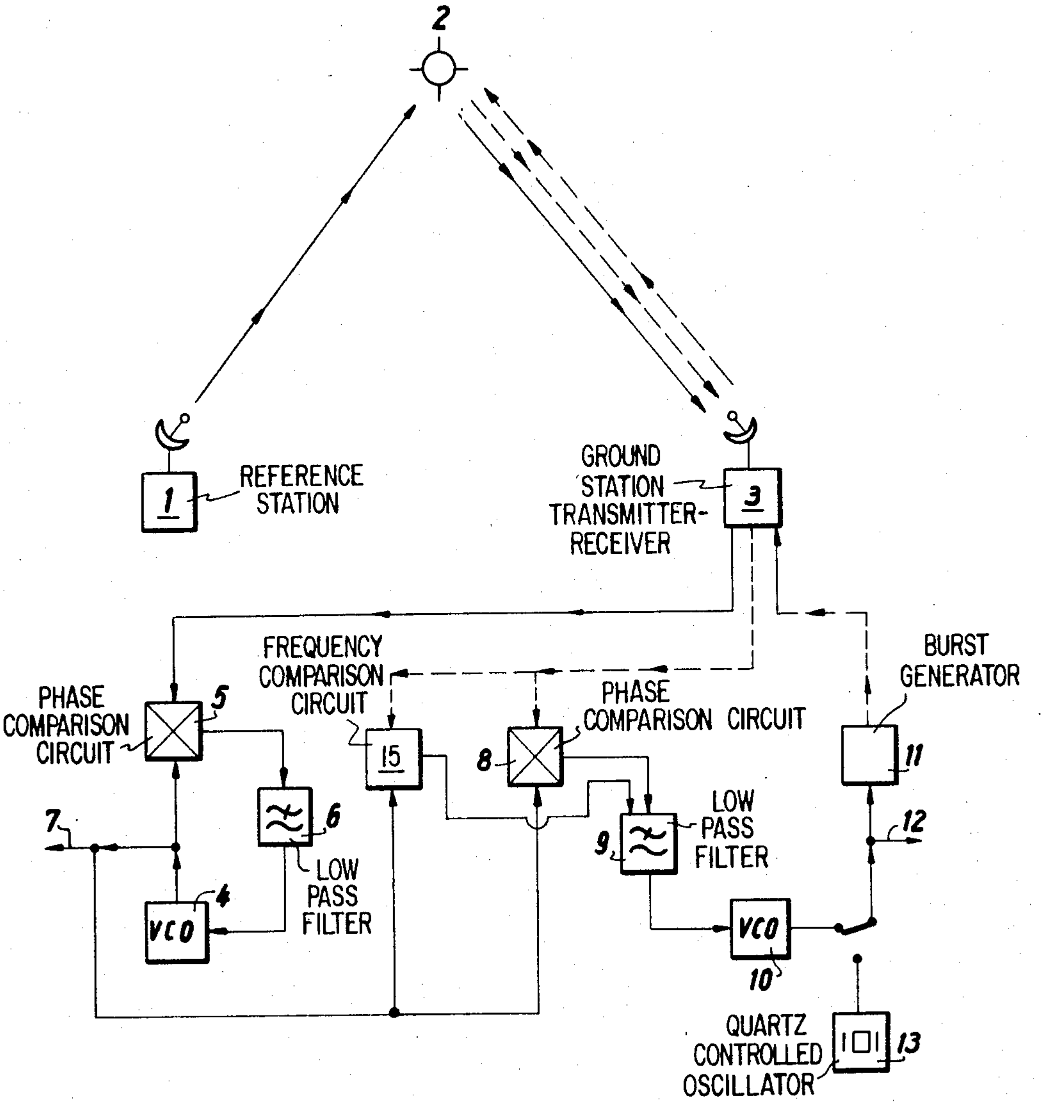
FIG. 1 is a block diagram of one preferred embodiment of the invention.

FIG. 1 shows the block circuit diagram for only one of the ground stations participating in the system according to the invention and illustrates all of the principal features of the present invention. Moreover, while the circuit components will be described with respect to generating and synchronizing the bit timing signals, the circuit will serve just as well for the generation and synchronization of the carrier frequency, or its associated intermediate frequency, the difference being only that the oscillator frequencies will have different values. The term "clock frequency" in the following description need only then be replaced by "carrier frequency" or "intermediate frequency."

The reference burst transmitted by some reference station 1 via a satellite 2 is received at the receiver-transmitter 3 of another ground station where the phase of the derived bit timing signal, or clock frequency, is compared in a first phase comparison circuit 5 with that of the output signal of a first voltage controlled oscillator (VCO) 4 whose frequency can be regulated. The output signal of the phase comparison circuit 5 regulates, through a first low-pass filter 6, the frequency of this oscillator 4 in such a manner that the phase angle between its output voltage and the clock frequency of the received reference burst almost disappears. Thus, this first control loop is closed. The output signal 7 from the first oscillator 4 represents the timing signal for interpreting the data flow arriving at the ground station 3. The output from filter 6 is preferably held constant during the intervals between reference bursts.

The phase position of this timing signal 7 is also compared in a second phase comparison circuit 8 with that of the timing signal of the returning own burst emitted by station 3. The phase difference here produces a control voltage which is fed through a further low-pass filter 9 to a second voltage controlled oscillator (VCO) 10 to control the frequency of its output signal.

The output signal 12 from this second oscillator 10 provides the clock frequency which is required at the transmitting end of station 3 for the generation in burst generator 11 of the own burst to be transmitted. This second control loop is closed by the transmission to the satellite and subsequent return of the own burst of station 3.

Thus, the system according to the invention assures that each station 3 will produce its "own burst" in such a manner that this burst will be received back from the satellite by the station in phase, i.e., coherently, with the reference burst which it receives from reference station 1. Since the reference burst and the received "own burst" of station 3 both travel over the same path from satellite 2 to station 3, it must follow that these two bursts must be in phase, i.e., coherent at satellite 2. As long as all receiving stations are similarly controlled, their local reference signals will always be synchronized with the data being received.

Since this second control loop is subject to the signal delay time from ground station 3 to the satellite and back, it results that the control loop time constant must be high with respect to this delay time and thus the upper limit frequency of the second low-pass filter 9 must be correspondingly low. The control time constant of the second control circuit 2, 3, 8, 9, 10, 11 is thus preferably higher than that of the first control circuit 4, 5, 6.

The illustrated control of the various frequencies by means of oscillators which can be regulated by a direct voltage can of course also be constituted by one of the known digital phase or frequency regulating methods. Transmitter-receiver 3 controls the distribution of signals to circuit 5 and 8 in a well-known manner.

The reference station 1 differs from the other stations only in that the second frequency-controlled oscillator 10 may be replaced by a constant-frequency, e.g., quartz-controlled, oscillator 13, for example by switching. The second phase comparison circuit 8 and the second low-pass filter 9 may be eliminated in this case.

However, a station constructed in the above-described manner can also be used as a reference station without any modifications. Since in this case reference and own burst are identical, the second oscillator 10 does not receive a control voltage and produces an uncontrolled oscillation. Instead of, or in addition to, the reference burst, it is also possible to use, for purposes of phase comparison in the first control loop 4, 5, 6, any one of the other bursts transmitted from other stations than the reference station which are synchronized with the reference burst.

In addition to the phase comparison circuits 5 and 8, frequency comparison circuits, such as 15, can also be used which additionally furnish an output voltage proportional to, and having a polarity representative of the sense of, the frequency difference between the two input signals to control the subsequently connected frequency-controlled oscillator. This may be necessary, in particular in the second control loop 2, 3, 8, 9, 10, 11 when frequency shifts produced for instance by the Doppler effect become greater than about a quarter of the inverse of the signal delay time from ground station to satellite to ground station. Without such an additional frequency comparison circuit, it might then occur that the synchronization in the second control loop, if it should have been unsynchronized due to a malfunction, can not be automatically restored. Such frequency comparison circuits are well-known in the art.

The continuous control effected by the above-described phase comparison circuit can create certain drawbacks. It has been shown, for example, that the stability of the control realized in this manner in the face of undesired control oscillations presents difficulties.

In order to improve the stability of the control loop consisting of elements 2, 3, 8, 9, 10 and 11 and experiencing the signal delay time $\tau$ to the satellite and back, a variation of the present invention permits a keyed control which takes the place of the continuous control.

Figure 2:
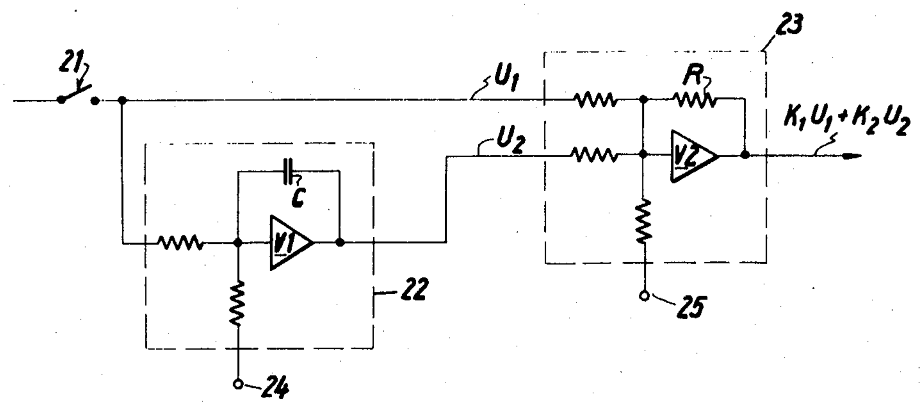
FIG. 2 is a circuit diagram of an alternate form of construction of one element of the embodiment of FIG. 1.

For this purpose the low-pass filter 9 of FIG. 1 is replaced by the circuit shown in FIG. 2. The output signal from the phase comparison circuit 8 (not shown) is fed to a scanning switch 21, which is periodically closed for short intervals at a switching rate which is longer than the transit, or delay, time $\tau$ of the signal to the satellite and back, the intervals during which the switch is closed being short with respect to this period. For a synchronous, or "stationary," satellite the above-mentioned delay time $\tau$ is approximately 0.24 seconds. The time during which the switch 21 is open must thus be longer than the delay time $\tau$.

The output voltage $U_1$ from this scanning switch 21 is, on the one hand, multiplied directly by a factor $K_1$ and, on the other hand, after being integrated in an integrating circuit 22 to produce a voltage $U_2$, is multiplied by a further factor $K_2$, after which the two voltages are fed to a summing circuit 23 whose output voltage $K_1U_1+K_2U_2$ controls the oscillator 10 of the circuit shown in FIG. 1.

It is also possible to feed a voltage to the integrating circuit 22 and/or the summing circuit 23 through a further summing input 24 or 25, respectively, which voltage has an arithmetic mean value proportional to the difference between the two frequencies applied to the phase comparison circuit 8 (FIG. 1) and which has a polarity representing the sense of this difference. This facilitates synchronization of the circuit when it is placed into operation.

The integrating circuit 22 is preferably constituted by an operational amplifier $V_1$ with feedback through a capacitor C and the summing circuit 23 by an operational amplifier $V_2$ with feedback through a resistor R.

It will be understood that the above description of the present invention is susceptible to various modifications, changes and adaptations.

I claim:

1. A method for synchronizing the time-division multiplex transmission of digital data signals via a satellite between a plurality of ground stations, one of which is a reference station, comprising the steps of:

a. generating at the reference station a signal having a fixed frequency constituting a basic reference frequency for such transmission and transmitting reference bursts of this fixed frequency from the reference station to the satellite;
b. receiving these reference bursts from the satellite at a second ground station;
c. generating at such second ground station a local reception control signal whose frequency is substantially equal to such fixed frequency;

d. electronically comparing, at such second station, the phase of the received reference bursts with the phase of the local reception control signal;

e. varying, on the basis of such comparison, the local reception control signal in a direction to eliminate the phase difference between the received reference bursts and the local reception control signal, whereby the local reception control signal provides a reference for processing the data signals received by the second station;

f. generating at the second station a local transmission control signal and transmitting local reference bursts of this signal to the satellite;

g. receiving these local reference bursts back from the satellite at the second station;

h. electronically comparing, at the second station, the phase of the local reference bursts received back from the satellite with the phase of the local reception control signal; and i. varying the local transmission control signal in a direction to eliminate the phase difference, at the second station, between the received local reference bursts and the local reception control signal, whereby the local transmission control signal provides a reference for transmitting, from the second station, data which will arrive at the satellite coherently with data transmitted from the reference station.

2. Apparatus for synchronizing the time-division multiplex transmission of digital data signals via a satellite between a plurality of ground stations, one of which is a reference station, comprising the steps of:

a. first generating means located at the reference station for generating a signal having a fixed frequency constituting a basic reference frequency for such transmission and for transmitting reference bursts of this fixed frequency from the reference station to the satellite;

b. receiving means at a second ground station for receiving these reference bursts from the satellite;

c. second generating means at the second ground station for generating a local reception control signal whose frequency is substantially equal to such fixed frequency;

d. comparator means at such second station connected to said receiving means and said second generating means for comparing the phase of the received reference bursts with the phase of the local reception control signal;

e. generator control means connected between said comparator means and said second control means for varying, on the basis of such comparison, the local reception control signal in a direction to eliminate the phase difference between the received reference bursts and the local reception control signal, whereby the local reception control signal provides a reference for processing the data signals received by the second station;

f. third generating means at the second station for generating a local transmission control signal and for transmitting local reference bursts of this signal to the satellite, said receiving means acting to receive these local reference bursts back from the satellite at the second station;

g. second comparator means at the second station connected to said receiving means and said second generating means for comparing the phase of the local reference bursts received back from the satellite with the phase of the local reception control signal; and h. second generator control means connected between said second comparator means and said third generating means for varying the local transmission control signal in a direction to eliminate the phase difference, at the second station, between the received local reference bursts and the local reception control signal, whereby the local transmission control signal provides a reference for transmitting, from the second station, data which will arrive at the satellite coherently with data transmitted from the reference station.

3. An arrangement as defined in claim 2 wherein said comparator means and said second comparator means are each constituted by a low-pass filter and said low-pass filter of said comparator means has a longer time constant than said low-pass filter of said first defined comparator means.

4. An arrangement as defined in claim 2 wherein at least one of said generator control means is constituted by a digital control device.

5. An arrangement as defined in claim 2 wherein said apparatus is employed for synchronizing the carrier frequencies of the plurality of stations with respect to the satellite, and said first generating means generates a signal whose fixed frequency bears a predetermined relation to the carrier frequency transmitted by said reference station.

6. An arrangement as defined in claim 5 further comprising a second set of all of said means provided for synchronizing the clock frequencies of said ground stations, wherein the fixed frequency produced by said first generating means of said second set of means is equal to the clock frequency at which signals are transmitted by said reference station.

7. An arrangement as defined in claim 2 wherein said third generating means comprise a frequency-controllable local oscillator having its input connected to the output of said second generator control means, and a burst generator connected to the output of said local oscillator, said arrangement further comprising fourth generating means for generating a signal having a fixed frequency and switch means connected to said burst generator, said local oscillator and said fourth generating means for selectively connecting the input of said burst generator to one of said local oscillator and said fourth generating means.

8. An arrangement as defined in claim 2 wherein there are more than two ground stations each provided with a respective set of said means located at said second ground station.

9. An arrangement as defined in claim 2 further comprising a source at the second ground station of bursts synchronized with the received reference bursts and means for selectively connecting a respective one of said source and said receiving means to said comparator means.

10. An arrangement as defined in claim 2 wherein at least one of said comparator means and second comparator means is constituted by a frequency comparison circuit for providing an output signal whose amplitude is proportional to the frequency difference between the two signals applied to said comparator means and whose polarity represents the sense of such frequency difference.

11. An arrangement as defined in claim 2, wherein said second generator control means are constituted by a keyed control device periodically connected to said second comparator means.

12. An arrangement as defined in claim 2, wherein said second generator control means comprise: a switch connected in series with said second comparator means and arranged to be periodically closed at a rate such that the periods during which said switch is open are longer than the travel time of the local reference bursts from the second ground station to the satellite and back to the second ground station, and the intervals during which the switch is closed are short with respect to this travel time; multiplying means connected to said switch for receiving the output from said second comparator means and for multiplying such output by a first multiplication factor; integrator means connected to said switch for integrating the output from said comparator means and for multiplying the resulting integral by a second multiplication factor; and a summing circuit connected to said multiplying means and said integrating means for producing an output proportional to the algebraic sum of the outputs of said multiplying means and said integrating means, the output of said summing means being connected to said third generating means.

13. An arrangement as defined in claim 12 wherein at least one of said multiplying means and said summing circuit is provided with a further input for receiving a voltage whose amplitude is proportional to the difference between the frequencies of the signal supplied to said second phase comparison circuit and whose polarity is representative of the sense of such difference.

14. An arrangement as defined in claim 12 wherein said integrating circuit is constituted by an operational amplifier and a capacitor connected to said amplifier to form a feedback loop therefor.

15. An arrangement as defined in claim 13 wherein said summing circuit is constituted by an operational amplifier and a resistor connected to said amplifier to form a feedback loop therefor.

* * * * *